(12) United States Patent  
Wahba et al.

(10) Patent No.: US 12,077,024 B2  
(45) Date of Patent: Sep. 3, 2024

(54) ANGLE AND ORIENTATION MEASUREMENTS FOR VEHICLES WITH MULTIPLE DRIVABLE SECTIONS

(71) Applicant: TUSIMPLE, INC., San Diego, CA (US)

(72) Inventors: Mohamed Hassan Ahmed Hassan Wahba, Tucson, AZ (US); Juexiao Ning, Tucson, AZ (US); Xiaoling Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/328,912

(22) Filed: Jun. 5, 2023

(65) Prior Publication Data

US 2023/0311596 A1    Oct. 5, 2023

Related U.S. Application Data

(63) Continuation of application No. 17/346,567, filed on Jun. 14, 2021, now Pat. No. 11,701,931.

(Continued)

(51) Int. Cl.
*B62D 53/08*    (2006.01)
*B60D 1/01*    (2006.01)
(Continued)

(52) U.S. Cl.
CPC ............. *B60D 1/245* (2013.01); *B60D 1/015* (2013.01); *B60D 1/62* (2013.01); *B62D 13/06* (2013.01);
(Continued)

(58) Field of Classification Search
CPC .......................... B62D 15/023; B62D 53/0871
See application file for complete search history.

(56) References Cited

U.S. PATENT DOCUMENTS 5,152,544 A * 10/1992 Dierker, Jr. ........ B62D 53/0871
                                                        280/446.1
6,084,870 A    7/2000 Wooten et al.
(Continued)

FOREIGN PATENT DOCUMENTS

CN        106340197 A     1/2017
CN        106781591 A     5/2017
(Continued)

OTHER PUBLICATIONS

Adam Paszke, Abhishek Chaurasia, Sangpil Kim, and Eugenio Culurciello. Enet: A deep neural network architecture for real-time semantic segmentation. CoRR, abs/1606.02147, 2016.
(Continued)

*Primary Examiner* — Tony H Winner
*Assistant Examiner* — Hosam Shabara
(74) *Attorney, Agent, or Firm* — Perkins Coie LLP

(57) ABSTRACT

Techniques are described for measuring angle and/or orientation of a rear drivable section (e.g., a trailer unit of a semi-trailer truck) relative to a front drivable section (e.g., a tractor unit of the semi-trailer truck) using an example rotary encoder assembly. The example rotary encoder assembly comprises a base surface; a housing that includes a second end that is connected to the base surface and a first end that is at least partially open and is coupled to a housing cap; and a rotary encoder that is located in the housing in between the base surface and the housing cap, where the rotary encoder includes a rotatable shaft that protrudes from a first hole located in the housing cap, and where a top of the rotatable shaft located away from the rotary encoder is coupled to magnet(s).

20 Claims, 9 Drawing Sheets

Related U.S. Application Data

(60) Provisional application No. 63/040,662, filed on Jun. 18, 2020.

(51) Int. Cl.
  B60D 1/24 (2006.01)
  B60D 1/62 (2006.01)
  B62D 13/06 (2006.01)
  B62D 15/02 (2006.01)

(52) U.S. Cl.
  CPC ........ B62D 53/0871 (2013.01); *B62D 15/023* (2013.01); *B62D 53/0842* (2013.01)

(56) References Cited

U.S. PATENT DOCUMENTS

| | | |
|---|---|---|
| 6,263,088 B1 | 7/2001 | Crabtree et al. |
| 6,594,821 B1 | 7/2003 | Banning et al. |
| 6,777,904 B1 | 8/2004 | Degner et al. |
| 6,975,923 B2 | 12/2005 | Spriggs |
| 7,103,460 B1 | 9/2006 | Breed |
| 7,689,559 B2 | 3/2010 | Canright et al. |
| 7,742,841 B2 | 6/2010 | Sakai et al. |
| 7,783,403 B2 | 8/2010 | Breed |
| 7,844,595 B2 | 11/2010 | Canright et al. |
| 8,041,111 B1 | 10/2011 | Wilensky |
| 8,064,643 B2 | 11/2011 | Stein et al. |
| 8,082,101 B2 | 12/2011 | Stein et al. |
| 8,164,628 B2 | 4/2012 | Stein et al. |
| 8,175,376 B2 | 5/2012 | Marchesotti |
| 8,181,353 B2 * | 5/2012 | Driker ............... G01D 5/34738 33/1 PT |
| 8,271,871 B2 | 9/2012 | Marchesotti |
| 8,346,480 B2 | 1/2013 | Trepagnier et al. |
| 8,378,851 B2 | 2/2013 | Stein et al. |
| 8,392,117 B2 | 3/2013 | Dolgov et al. |
| 8,401,292 B2 | 3/2013 | Park et al. |
| 8,412,449 B2 | 4/2013 | Trepagnier et al. |
| 8,478,072 B2 | 7/2013 | Aisaka et al. |
| 8,532,870 B2 | 9/2013 | Hoetzer et al. |
| 8,553,088 B2 | 10/2013 | Stein et al. |
| 8,706,394 B2 | 4/2014 | Trepagnier et al. |
| 8,718,861 B1 | 5/2014 | Montemerlo et al. |
| 8,788,134 B1 | 7/2014 | Litkouhi et al. |
| 8,908,041 B2 | 12/2014 | Stein et al. |
| 8,917,169 B2 | 12/2014 | Schofield et al. |
| 8,917,170 B2 * | 12/2014 | Padula ................... B62D 53/08 280/433 |
| 8,963,913 B2 | 2/2015 | Baek |
| 8,965,621 B1 | 2/2015 | Urmson et al. |
| 8,981,966 B2 | 3/2015 | Stein et al. |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi et al. |
| 9,042,648 B2 | 5/2015 | Wang et al. |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes et al. |
| 9,118,816 B2 | 8/2015 | Stein |
| 9,120,485 B1 | 9/2015 | Dolgov |
| 9,122,954 B2 | 9/2015 | Srebnik et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,214,084 B2 | 12/2015 | Grauer et al. |
| 9,219,873 B2 | 12/2015 | Grauer et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein et al. |
| 9,297,641 B2 | 3/2016 | Stein |
| 9,299,004 B2 | 3/2016 | Lin et al. |
| 9,315,192 B1 | 4/2016 | Zhu et al. |
| 9,317,033 B2 | 4/2016 | Ibanez-Guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,347,779 B1 | 5/2016 | Lynch |
| 9,355,635 B2 | 5/2016 | Gao et al. |
| 9,365,214 B2 | 6/2016 | Ben Shalom et al. |
| 9,399,397 B2 | 7/2016 | Mizutani et al. |
| 9,418,549 B2 | 8/2016 | Kang et al. |
| 9,428,192 B2 | 8/2016 | Schofield et al. |
| 9,436,880 B2 | 9/2016 | Bos et al. |
| 9,438,878 B2 | 9/2016 | Niebla, Jr. et al. |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield et al. |
| 9,483,839 B1 | 11/2016 | Kwon et al. |
| 9,490,064 B2 | 11/2016 | Hirosawa et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein et al. |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali et al. |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris et al. |
| 9,723,099 B2 | 8/2017 | Chen et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath et al. |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang et al. |

(56) References Cited

U.S. PATENT DOCUMENTS

| | | |
|---|---|---|
| 10,147,193 B2 | 12/2018 | Huang et al. |
| 10,223,806 B1 | 3/2019 | Yi et al. |
| 10,223,807 B1 | 3/2019 | Yi et al. |
| 10,410,055 B2 | 9/2019 | Wang et al. |
| 10,670,479 B2 | 6/2020 | Reed et al. |
| 10,942,271 B2 | 3/2021 | Han et al. |
| 11,221,262 B2 | 1/2022 | Reed et al. |
| 2003/0114980 A1 | 6/2003 | Klausner et al. |
| 2003/0174773 A1 | 9/2003 | Comaniciu et al. |
| 2004/0264763 A1 | 12/2004 | Mas et al. |
| 2007/0034787 A1* | 2/2007 | Mutschler ............... F16D 1/096 250/231.13 |
| 2007/0067077 A1 | 3/2007 | Liu et al. |
| 2007/0183661 A1 | 8/2007 | El-Maleh et al. |
| 2007/0183662 A1 | 8/2007 | Wang et al. |
| 2007/0230792 A1 | 10/2007 | Shashua et al. |
| 2007/0286526 A1 | 12/2007 | Abousleman et al. |
| 2008/0249667 A1 | 10/2008 | Horvitz et al. |
| 2009/0040054 A1 | 2/2009 | Wang et al. |
| 2009/0087029 A1 | 4/2009 | Coleman et al. |
| 2010/0049397 A1 | 2/2010 | Liu et al. |
| 2010/0111417 A1 | 5/2010 | Ward et al. |
| 2010/0226564 A1 | 9/2010 | Marchesotti et al. |
| 2010/0281361 A1 | 11/2010 | Marchesotti |
| 2011/0142283 A1 | 6/2011 | Huang et al. |
| 2011/0206282 A1 | 8/2011 | Aisaka et al. |
| 2011/0247031 A1 | 10/2011 | Jacoby |
| 2011/0257860 A1 | 10/2011 | Getman et al. |
| 2012/0041636 A1 | 2/2012 | Johnson et al. |
| 2012/0105639 A1 | 5/2012 | Stein et al. |
| 2012/0140076 A1 | 6/2012 | Rosenbaum et al. |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa et al. |
| 2014/0198184 A1 | 7/2014 | Stein et al. |
| 2014/0321704 A1 | 10/2014 | Partis |
| 2014/0334668 A1 | 11/2014 | Saund |
| 2015/0062304 A1 | 3/2015 | Stein et al. |
| 2015/0269438 A1 | 9/2015 | Samarsekera et al. |
| 2015/0310370 A1 | 10/2015 | Burry et al. |
| 2015/0353082 A1 | 12/2015 | Lee et al. |
| 2016/0008988 A1 | 1/2016 | Kennedy et al. |
| 2016/0026787 A1 | 1/2016 | Nairn et al. |
| 2016/0037064 A1 | 2/2016 | Stein et al. |
| 2016/0094774 A1 | 3/2016 | Li et al. |
| 2016/0118080 A1 | 4/2016 | Chen |
| 2016/0129907 A1 | 5/2016 | Kim et al. |
| 2016/0165157 A1 | 6/2016 | Stein et al. |
| 2016/0210528 A1 | 7/2016 | Duan |
| 2016/0275766 A1 | 9/2016 | Venetianer et al. |
| 2016/0280261 A1 | 9/2016 | Kyrtsos et al. |
| 2016/0321381 A1 | 11/2016 | English et al. |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0080928 A1 | 3/2017 | Wasiek et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0301104 A1 | 10/2017 | Qian |
| 2017/0305423 A1 | 10/2017 | Green |
| 2017/0318407 A1 | 11/2017 | Meister |
| 2017/0334484 A1 | 11/2017 | Koravadi |
| 2018/0057052 A1 | 3/2018 | Dodd et al. |
| 2018/0151063 A1 | 5/2018 | Pun et al. |
| 2018/0158197 A1 | 6/2018 | Dasgupta et al. |
| 2018/0260956 A1 | 9/2018 | Huang et al. |
| 2018/0283892 A1 | 10/2018 | Behrendt |
| 2018/0373980 A1 | 12/2018 | Huval |
| 2019/0025853 A1 | 1/2019 | Julian |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0066344 A1 | 2/2019 | Luo et al. |
| 2019/0084477 A1 | 3/2019 | Gomez-Mendoza et al. |
| 2019/0108384 A1 | 4/2019 | Wang et al. |
| 2019/0132391 A1 | 5/2019 | Thomas et al. |
| 2019/0132392 A1 | 5/2019 | Liu et al. |
| 2019/0170867 A1 | 6/2019 | Wang et al. |
| 2019/0210564 A1 | 7/2019 | Han et al. |
| 2019/0210613 A1 | 7/2019 | Sun et al. |
| 2019/0225286 A1 | 7/2019 | Schutt et al. |
| 2019/0236950 A1 | 8/2019 | Li et al. |
| 2019/0266420 A1 | 8/2019 | Ge et al. |
| 2020/0331441 A1* | 10/2020 | Sielhorst ................ B62D 53/12 |
| 2021/0394570 A1 | 12/2021 | Wahba et al. |
| 2022/0146285 A1 | 5/2022 | Dölz |

FOREIGN PATENT DOCUMENTS

| | | |
|---|---|---|
| CN | 108010360 A | 5/2018 |
| DE | 2608513 A1 | 9/1977 |
| DE | 102016105259 A1 | 9/2016 |
| DE | 102017125662 A1 | 5/2018 |
| EP | 0433858 A2 | 6/1991 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| GB | 2470610 A | 12/2010 |
| GB | 2513392 A | 10/2014 |
| JP | 2010117207 A | 5/2010 |
| JP | 5082472 B2 * | 11/2012 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2017013875 A1 | 5/2018 |
| WO | 2019040800 A1 | 2/2019 |
| WO | 2019084491 A1 | 5/2019 |
| WO | 2019084494 A1 | 5/2019 |
| WO | 2019101848 A1 | 5/2019 |
| WO | 2019140277 A2 | 7/2019 |
| WO | 2019168986 A1 | 9/2019 |
| WO | 2020092563 A1 | 5/2020 |

OTHER PUBLICATIONS

Adhiraj Somani, Nan Ye, David Hsu, and Wee Sun Lee, "DESPOT: Online POMDP Planning with Regularization", Department of Computer Science, National University of Singapore, date unknown.

Bar-Hillel, Aharon et al. "Recent progress in road and lane detec-

(56) References Cited

OTHER PUBLICATIONS tion: a survey." Machine Vision and Applications 25 (2011): 727-745.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).
Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.
Dai, Jifeng, Kaiming He, Jian Sun, (Microsoft Research), "Instance-aware Semantic Segmentation via Multi-task Network Cascades", CVPR 2016.
Engel, J. et la. "LSD-SLAM: Large Scare Direct Monocular SLAM," pp. 1-16, Munich.
Geiger, Andreas et al., "Automatic Camera and Range Sensor Calibration using a single Shot", Robotics and Automation (ICRA), pp. 1-8, 2012 IEEE International Conference.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Yuille, Alan and Koch, Christof, "A Meta-Theory of Boundary Detection Benchmarks", arXiv preprint arXiv:1302.5985, 2013.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Dynamic Visual Attention: Searching For Coding Length Increments", Advances in Neural Information Processing Systems, vol. 21, pp. 681-688, 2008.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi, "Computational Modeling and Psychophysics in Low and Mid-Level Vision", California Institute of Technology, 2014.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
International Application No. PCT/US18/53795, International Search Report and Written Opinion Mailed Dec. 31, 2018.
International Application No. PCT/US18/57848, International Search Report and Written Opinion Mailed Jan. 7, 2019.
International Application No. PCT/US19/12934, International Search Report and Written Opinion Mailed Apr. 29, 2019.
International Application No. PCT/US19/25995, International Search Report and Written Opinion Mailed Jul. 9, 2019.
International Application No. PCT/US19/58863, International Search Report and Written Opinion mailed Feb. 14, 2020.
International Application No. PCT/US2018/047608, International Search Report and Written Opinion Mailed Dec. 28, 2018.
International Application No. PCT/US2018/047830, International Search Report and Written Opinion Mailed Apr. 27, 2017.
International Application No. PCT/US2018/057851, International Search Report and Written Opinion Mailed Feb. 1, 2019.
International Application No. PCT/US2019/013322, International Search Report and Written Opinion Mailed Apr. 2, 2019.
International Application No. PCT/US2019/019839, International Search Report and Written Opinion Mailed May 23, 2019.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
Kendall, Alex, Gal, Yarin, "What Uncertainties Do We Need in Bayesian Deep Learning for Computer Vision", arXiv:1703.04977v1 [cs.CV] Mar. 15, 2017.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
Li, Yanghao and Wang, Naiyan and Liu, Jiaying and Hou, Xiaodi, "Demystifying Neural Style Transfer", arXiv preprint arXiv:1701.01036, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Luo, Yi et al. U.S. Appl. No. 15/684,389 Notice of Allowance Mailed Oct. 9, 2019.
Macaodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Mohammad Norouzi, David J. Fleet, Ruslan Salakhutdinov, "Hamming Distance Metric Learning", Departments of Computer Science and Statistics, University of Toronto, date unknown.
Mur-Artal, R. et al., "Orb-Slam: A Versatile and Accurate Monocular SLAM System," IEEE Transaction on Robotics, Oct. 2015, pp. 1147-1163, vol. 31, No. 5, Spain.
Office Action Mailed in Chinese Application No. 201810025516.X, Mailed Sep. 3, 2019.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

(56) References Cited

OTHER PUBLICATIONS

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Sattler, T. et al., "Are Large-Scale 3D Models Really Necessary for Accurate Visual Localization?" CVPR, IEEE, 2017, pp. 1-10.

Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.

Schroff, Florian, Dmitry Kalenichenko, James Philbin, (Google), "FaceNet: A Unified Embedding for Face Recognition and Clustering", CVPR 2015.

Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Szeliski, Richard, "Computer Vision: Algorithms and Applications" http://szeliski.org/Book/, 2010.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Tian Li, "Proposal Free Instance Segmentation Based on Instance-aware Metric", Department of Computer Science, Cranberry-Lemon University, Pittsburgh, PA., date unknown.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Zhang, Z. et al. A Flexible new technique for camera calibration. IEEE Transactions on Pattern Analysis and Machine Intelligence (vol. 22, Issue: 11, Nov. 2000).

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Van Prooijen, Tom. European Application No. 21179854.1, Extended European Search Report, Mailed Nov. 10, 2021, pp. 1-8.

\* cited by examiner

ANGLE AND ORIENTATION MEASUREMENTS FOR VEHICLES WITH MULTIPLE DRIVABLE SECTIONS

CROSS-REFERENCE TO RELATED APPLICATIONS

This patent document is a continuation of U.S. patent application Ser. No. 17/346,567, filed on Jun. 14, 2021, which claims priority to and the benefit of U.S. Provisional Application No. 63/040,662 entitled "TRAILER ANGLE MEASUREMENT USING A ROTARY ENCODER TO THE FIFTH WHEEL" filed on Jun. 18, 2020. The entire disclosures of the aforementioned applications are hereby incorporated by reference as part of the disclosure of this application.

TECHNICAL FIELD

This document relates to systems, apparatus, and methods to measure angles and/or orientations on a vehicle with multiple drivable sections.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control the steering angle, a throttle amount to control the speed of the autonomous vehicle, gear changes, and/or a breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems, apparatus, and methods to measure angles and/or orientations (e.g., directions of rotations) of a rear drivable section of a vehicle relative to a front drivable section of the vehicle.

In an exemplary embodiment a vehicle, comprises a front drivable section that comprises a first connector and a rotary encoder assembly. The first connector is coupled to a chassis of the front drivable section, where the first connector is located towards a rear region of the first drivable section. The rotary encoder assembly comprises a base surface, a housing and a rotary encoder. The base surface of the rotary encoder assembly includes the base surface that is coupled to a surface located below the first connector. The housing of the rotary encoder assembly includes a first end that is at least partially open and a second end that is opposite to the first end, where the second end of the housing is connected to the base surface, and where the first end of the housing is coupled to a housing cap. The rotary encoder assembly includes the rotary encoder that is located in the housing in between the base surface and the housing cap, where the rotary encoder includes a rotatable shaft that protrudes from a first hole located in the housing cap, and where a top of the rotatable shaft located away from the rotary encoder is coupled to one or more magnets.

In some embodiments, the rotary encoder is coupled to the housing cap via a plurality of non-rigid compressible couplings that include a plurality of shoulder screws, and at least some portion of each of the plurality of shoulder screws are located in one of a plurality of springs having first ends that are located below the housing cap and second ends that are opposite to the first ends that are located above the rotary encoder. In some embodiments, the housing cap includes a first set of holes that are along a first perimeter of a first imaginary circle away from an edge of the housing cap, where each hole in the first set of holes includes a low-friction grommet through which a shoulder screw is coupled to the rotary encoder via a spring, where each shoulder screw includes a screw head on one end, a threaded surface on another opposite end, and a smooth shaft between the screw head and the threaded surface, and where the screw head of each shoulder screw is located at or above the housing cap, the smooth shaft of each should shoulder screw is located in one spring, and the threaded surface of each shoulder screw is located in a body of the rotary encoder.

In some embodiments, the housing cap includes a second set of holes that are along a second perimeter of a second imaginary circle that is closer to the edge of the housing cap than the first perimeter of the first imaginary circle that includes the first set of holes, where the second set of holes include screws that couple the housing cap to a flange located at the first end of the housing. In some embodiments, a center region of the first connector includes a third hole, and where a top region of the rotary encoder assembly accessible via the third hole in the first connector. In some embodiments, the plurality of shoulder screws and the plurality of springs are structured to have the rotary encoder retract in a first position away from the housing cap in response to an absence of a metallic material at the third hole in the first connector. In some embodiments, the plurality of shoulder screws and the plurality of springs are structured to have the rotary encoder extend in a second position towards the housing cap in response to a presence of a magnetic material at the third hole in the first connector. In some embodiments, the first connector comprises a groove located towards a rear of the front drivable section, and where the center region of the first connector where the groove ends includes the third hole.

In some embodiments, the vehicle further comprises a rear drivable section located behind the front drivable section, where the rear drivable section comprises a second connector coupled to the first connector, and where the second connector is magnetically coupled to the one or more magnets located on the top of the rotatable shaft of the rotary encoder assembly via the third hole in the first connector. In some embodiments, the rotatable shaft of the rotary encoder is structured to have a rotational movement that corresponds to a circular movement of the second connector of the rear drivable section, and where the circular movement of the second connector of the rear drivable section is translated to the rotational movement of the rotatable shaft via the one or more magnets. In some embodiments, the first connector includes a fifth wheel and where the second connector includes a king pin. In some embodiments, the vehicle includes a semi-trailer truck, where the front drivable section includes a tractor unit, and where the rear drivable section includes a trailer unit.

In some embodiments, the front drivable section includes a computer comprising one or more processors and a memory configured to store one or more programs, where the one or more programs upon execution configure the one or more processors to: receive, from the rotary encoder and while the vehicle is operated on a road, information that indicates an angle or a direction of rotation of the rear drivable section relative to the front drivable section; cause the vehicle to perform an autonomous driving operation based on the angle or the direction of rotation of the rear drivable section. In some embodiments, the one or more processors are configured to cause the vehicle to perform the autonomous driving operation by being configured to: determine that the angle of the rear drivable section is outside a range of angles allowed for the rear drivable section when the vehicle is operated on the road at a speed greater than or equal to a threshold value; and send instruction to a motor in a steering system of the vehicle to cause the vehicle to steer to move the trailer unit within the range of angles allowed for the rear drivable section. In some embodiments, the one or more processors are further configured to: display, on a monitor located in the vehicle, the front drivable section and the rear drivable section, where an orientation of the rear drivable section relative to the front drivable section is displayed based on the angle received from the rotary encoder.

In some embodiments, the rotary encoder is connected to a movable cable, and the base surface includes a second hole located within a region where the housing is connected to the base surface such that at least some portion of the movable cable enters the housing via the second hole In an exemplary embodiment, a rotary encoder assembly comprises a base surface, a housing, and a rotary encoder. The base surface of the rotary encoder assembly includes a plurality of holes located at close to an edge of the base surface. The housing of the rotary encoder assembly includes a first end that is at least partially open and a second end that is opposite to the first end, where the second end of the housing is connected to the base surface, and where the first end of the housing is coupled to a housing cap. The rotary encoder assembly includes the rotary encoder that is located in the housing in between the base surface and the housing cap, where the rotary encoder includes a rotatable shaft that protrudes from a first hole located in the housing cap, and where a top of the rotatable shaft located away from the rotary encoder is coupled to one or more magnets.

In some embodiments, the top of the rotatable shaft is coupled to the one or more magnets via a shaft adapter that is coupled to the rotatable shaft. In some embodiments, the base surface includes a second hole located within a region where the housing is connected to the base surface such that the rotary encoder is connectable to a movable cable via the second hole, and the second hole in the base surface includes a low-friction grommet through which the movable cable is connectable to the rotary encoder. In some embodiments, the rotary encoder is coupled to the housing cap via a plurality of non-rigid compressible couplings. In some embodiments, the first hole located in the housing cap includes a low-friction grommet through which at least some of the rotatable shaft protrudes from the first hole in the housing cap.

In yet another exemplary aspect, the above-described methods and the methods described in this patent document are embodied in a computer readable program stored on a non-transitory computer readable media. The computer readable program includes code that when executed by a processor, causes the processor to perform the methods described in this patent document.

In yet another exemplary embodiment, a device is disclosed that is configured or operable to perform the above-described methods and/or methods described in this patent document.

The above and other aspects and their implementations are described in greater detail in the drawings, the descriptions, and the claims.

DETAILED DESCRIPTION

Development in autonomous driving technology had led to the development of passenger vehicles that can autonomously drive passengers to a destination. However, certain unique challenges need to be addressed when autonomous driving technology is employed in a vehicle with multiple drivable sections (e.g., a semi-trailer trucks). For example, semi-trailer trucks can have multiple drivable sections where, for example, a tractor unit where a driver may sit moves differently than a trailer unit where goods may be located, where the trailer unit is connected to the tractor unit. Unlike semi-trailer trucks, passenger vehicles can be more easily maneuvered on roads at least because passenger vehicles tend to have a single rigid body. This patent document describes technology that can enable a vehicle with multiple drivable sections (e.g., a semi-trailer truck with tractor unit and trailer unit, a truck or a car with fifth wheel camper) to measure an angle and/or orientation (e.g., direction or rotation) of a rear drivable section (e.g., trailer unit or fifth wheel camper) relative to a front drivable section (e.g., a tractor unit, truck, or car) so that the vehicle can be autonomously driven by taking into account, for example, the angle and/or orientation of the rear drivable section relative to the front drivable section.

As shown below, in Section I, this patent document describes the devices located on or in a vehicle that can use angle and/or orientation measurements for autonomous driving operations. In Section II of this patent document, technologies are described to enable measurement of the angle and/or orientation of a rear drivable section of a vehicle relative to a front drivable section of the vehicle. The example headings for the various sections below are used to facilitate the understanding of the disclosed subject matter and do not limit the scope of the claimed subject matter in any way. Accordingly, one or more features of one example section can be combined with one or more features of another example section.

Figure 1:
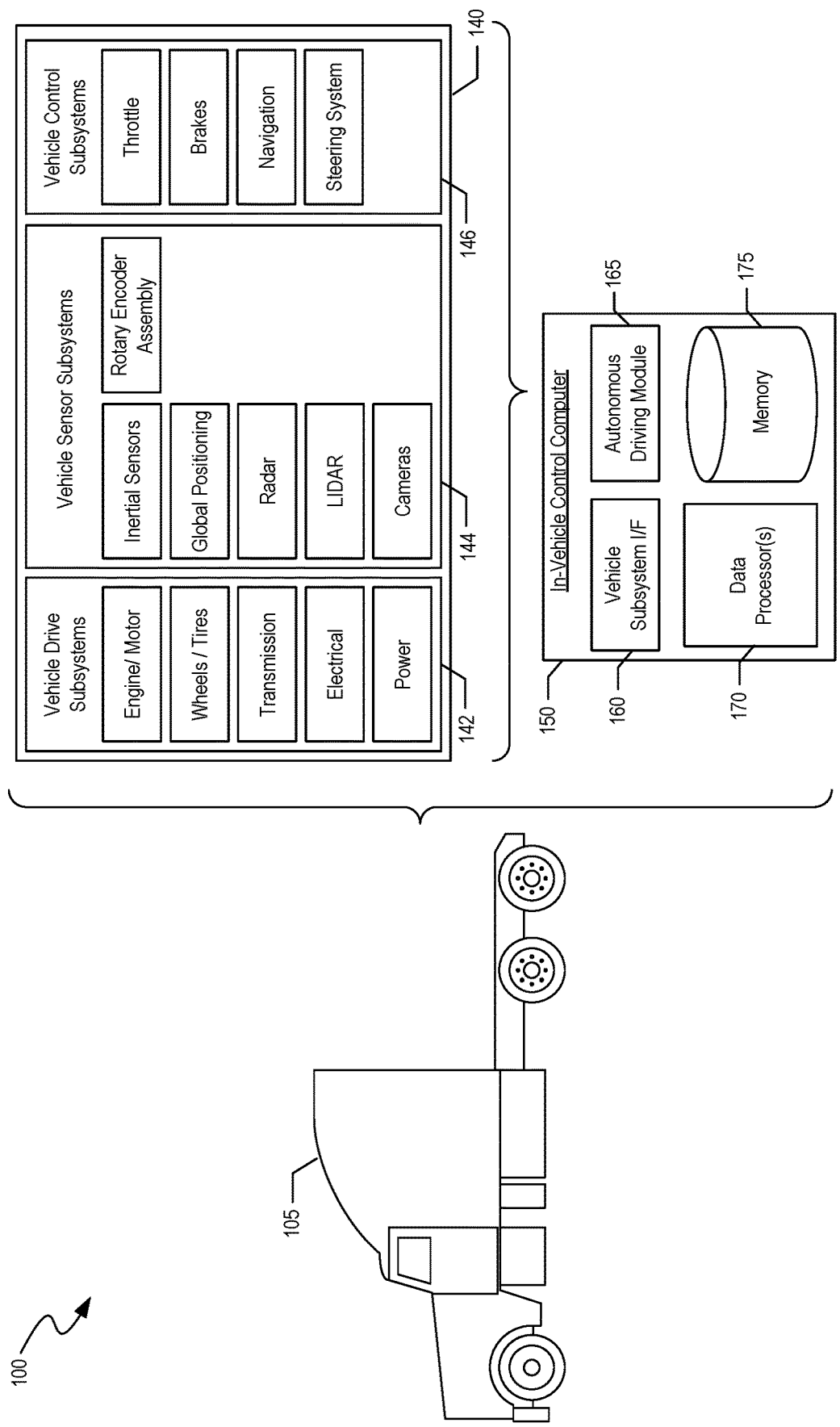
FIG. 1 shows a block diagram of an example ecosystem in which angle and/or orientation of a rear drivable section of a vehicle can be measured relative to a front drivable section of the vehicle.

I. Example Autonomous Vehicle Technology for Using Angle and/or Orientation Measurements FIG. 1 shows a block diagram of an example vehicle ecosystem 100 in which operations related to autonomous driving can be implemented in an in-vehicle control computer 150. The vehicle ecosystem 100 includes several systems and components that can generate and/or deliver one or more sources of information/data and related services to the in-vehicle control computer 150 that may be located in a vehicle 105. Examples of vehicle 105 include a car, a truck, or a semi-trailer truck. The in-vehicle control computer 150 can be in data communication with a plurality of vehicle subsystems 140, all of which can be resident in a user's vehicle 105. A vehicle subsystem interface 160 (e.g., a controller area network (CAN) device) is provided to facilitate data communication between the in-vehicle control computer 150 and the plurality of vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. For example, the vehicle sensor subsystem 144 may include a rotary encoder assembly, an inertial measurement unit (IMU), a Global Positioning System (GPS) transceiver, a RADAR unit, a laser range finder/LIDAR unit, and/or one or more cameras or image capture devices. As further explained in Section II of this patent document, the rotary encoder assembly is designed or configured to provide one or more measurements related to angle and/or orientation of a rear drivable section (e.g., tractor unit) relative to the front drivable section (e.g., trailer unit). In some embodiments, the rotary encoder assembly may be an absolute encoder that can provide angle and/or orientation of the rear drivable section relative to the front drivable section. The vehicle sensor subsystem 144 may also include sensors configured to monitor internal systems of the vehicle 105 (e.g., an $O_2$ monitor, a fuel gauge, an engine oil temperature).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a throttle, a brake unit, a navigation unit, and/or a steering system.

The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the data storage device 175 may contain processing instructions (e.g., program logic) executable by the data processor 170 to perform various methods and/or functions of the vehicle 105, including those described in this patent document. For instance, as further explained in Section II of this patent document, the data processor 170 executes the operations associated with autonomous driving module 165 for using the information provided by the rotary encoder assembly (e.g., the angle and/or orientation of the rear drivable section relative to the front drivable section of a vehicle 105) for operating the various vehicle subsystems (e.g., the vehicle drive subsystem 142, the vehicle sensor subsystem 144, and the vehicle control subsystem 146) of the vehicle 105 to autonomously operate the vehicle 105. The data storage device 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a data storage device 175.

The in-vehicle control computer 150 may control the function of the vehicle 105 based on inputs received from various vehicle subsystems (e.g., the vehicle drive subsystem 142, the vehicle sensor subsystem 144, and the vehicle control subsystem 146). For example, the in-vehicle control computer 150 may use data from the rotary encoder assembly in order to control the steering system to turn the vehicle 105 by taking into account the orientation and angle of the rear drivable section relative to the front drivable section. In an example embodiment, the in-vehicle control computer 150 can be operable to provide control over many aspects of the vehicle 105 and its subsystems.

Figure 2:
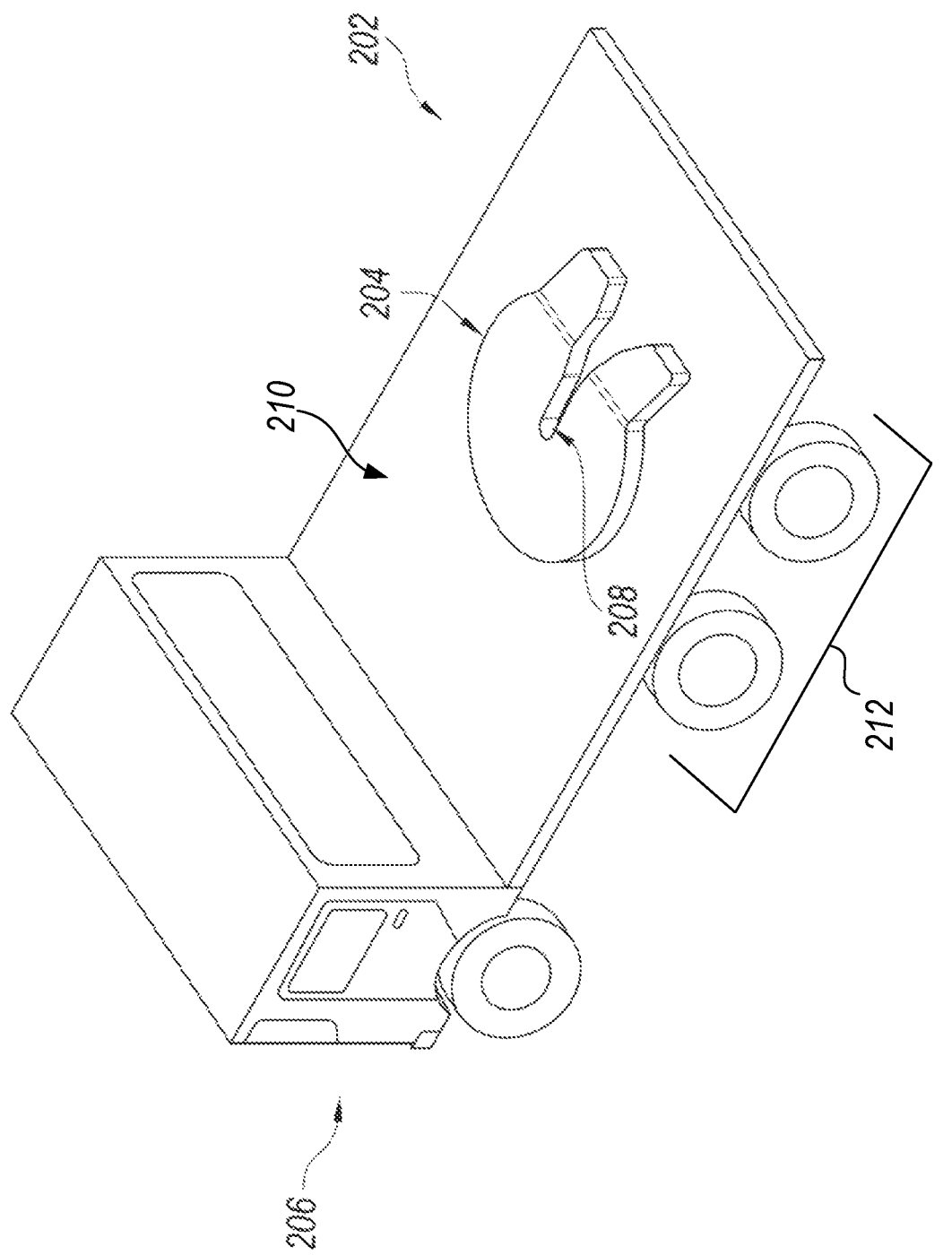
FIG. 2 shows a rear view of a semi-trailer truck with a fifth wheel.

II. Example Rotary Encoder Assembly for Performing Angle and/or Orientation Measurements FIG. 2 shows a rear view of a semi-trailer truck with a fifth wheel. The semi-trailer truck includes a tractor unit 202 that includes a fifth wheel 204 that is located towards a rear region 212 of the tractor unit 202. The fifth wheel 204 is movably coupled to the chassis 210 of the semi-trailer truck so that the fifth wheel 204 can be moved towards or away from a cab 206 of the tractor unit 202 for installation of different types of trailer units. The fifth wheel 204 may have a "A" shape cutout region or upside down "V" shape cutout region or a groove that is located on the fifth wheel 204 towards the rear of the tractor unit 202 or away from a cab 206 in the tractor unit 202 where a driver may sit. The groove extends inwards from an edge of the fifth wheel 204 that is farthest away from the cab 206. The groove ends at a center region 208 of the fifth wheel 204. The groove in the fifth wheel allows a trailer unit's king pin to slide inside and lock the trailer unit and the fifth wheel together in place so that the trailer unit is coupled to the tractor unit via the king pin and the fifth wheel. The fifth wheel may be covered with grease so that the trailer unit can slide along the top surface of the fifth wheel. In the center region 208 of the groove is a hole through which a rotary encoder assembly can engage with a king pin of a trailer unit as further explained below. In certain traditional implementations, a fifth wheel does not include a position sensing equipment so that there may be no sensing or measurement of the angle of the trailer unit at the fifth-wheel.

Figure 3A:
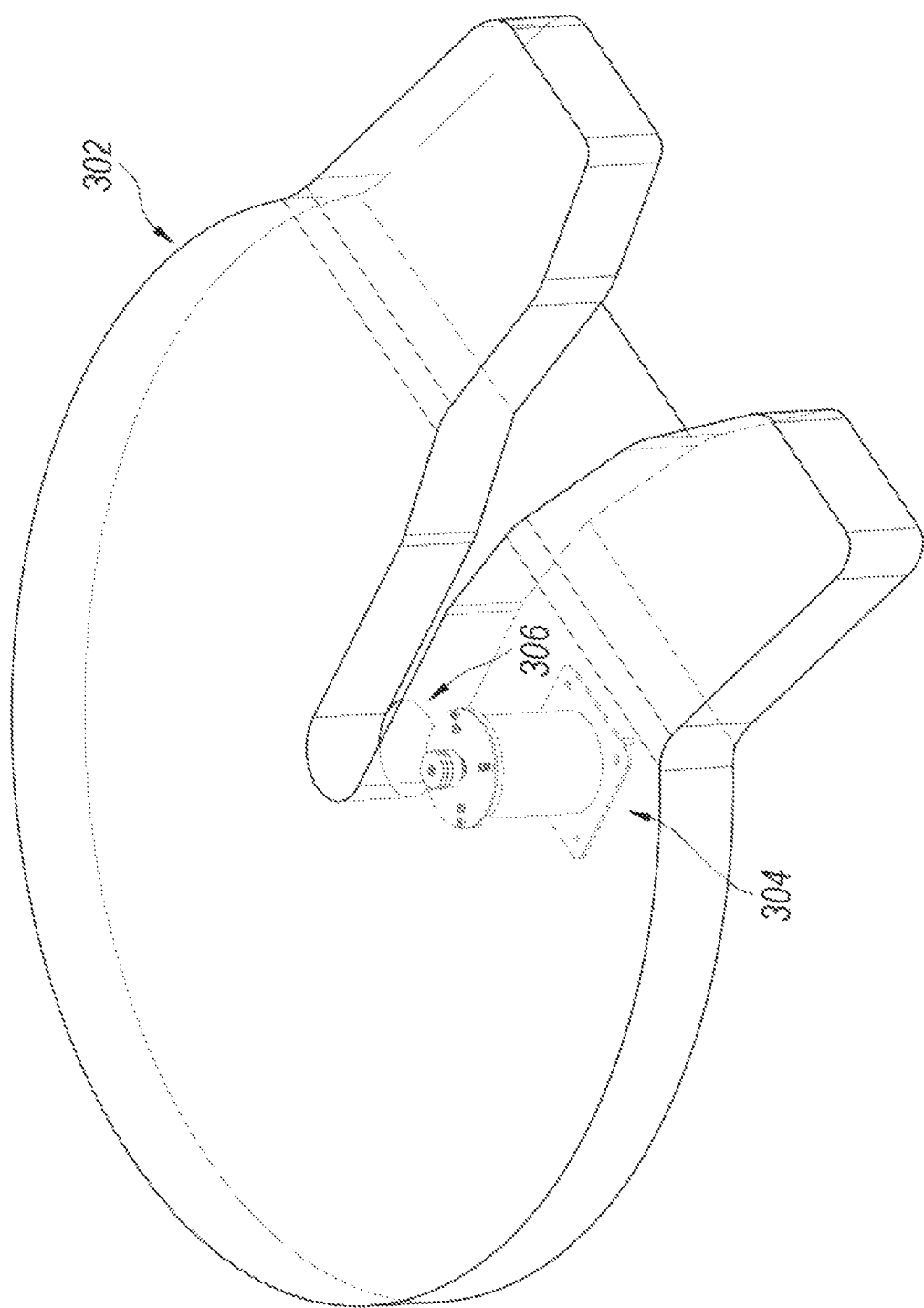
FIGS. 3A and 3B respectively show an isometric view and a top view of the fifth wheel with a rotary encoder assembly.
Figure 3B:
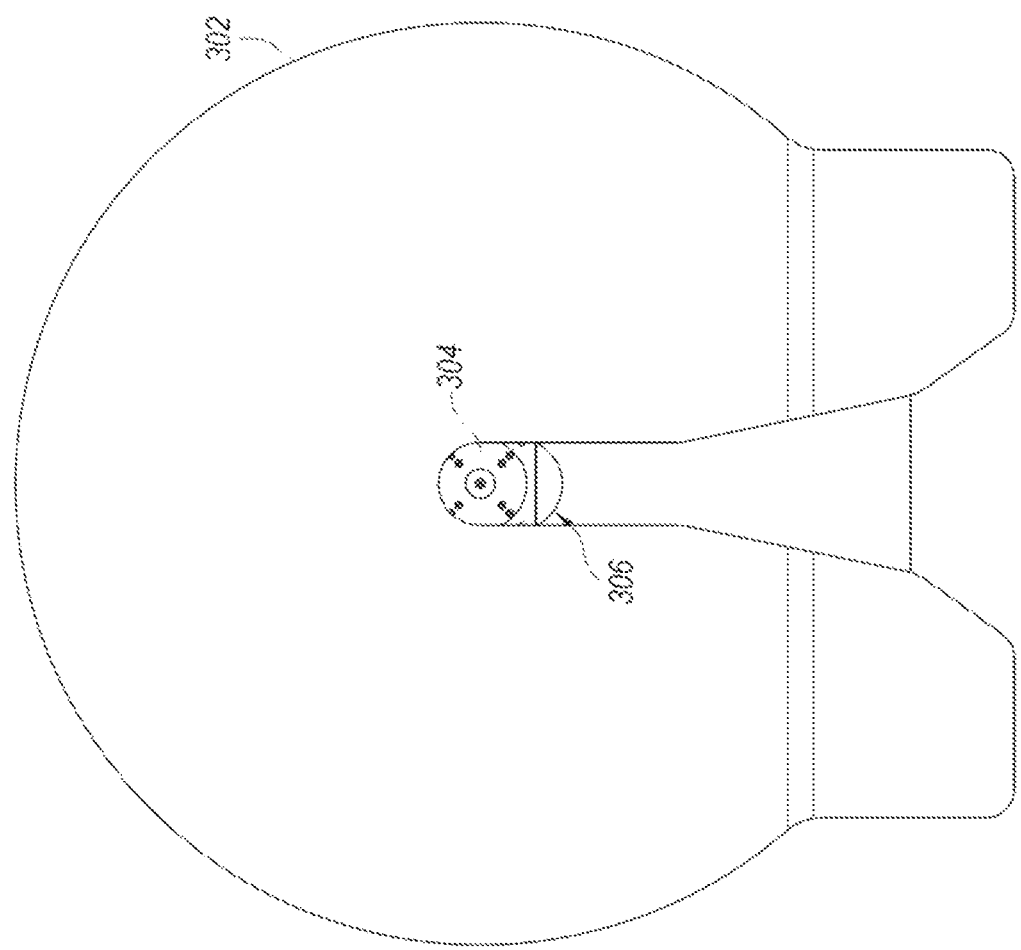
Figure 3C:
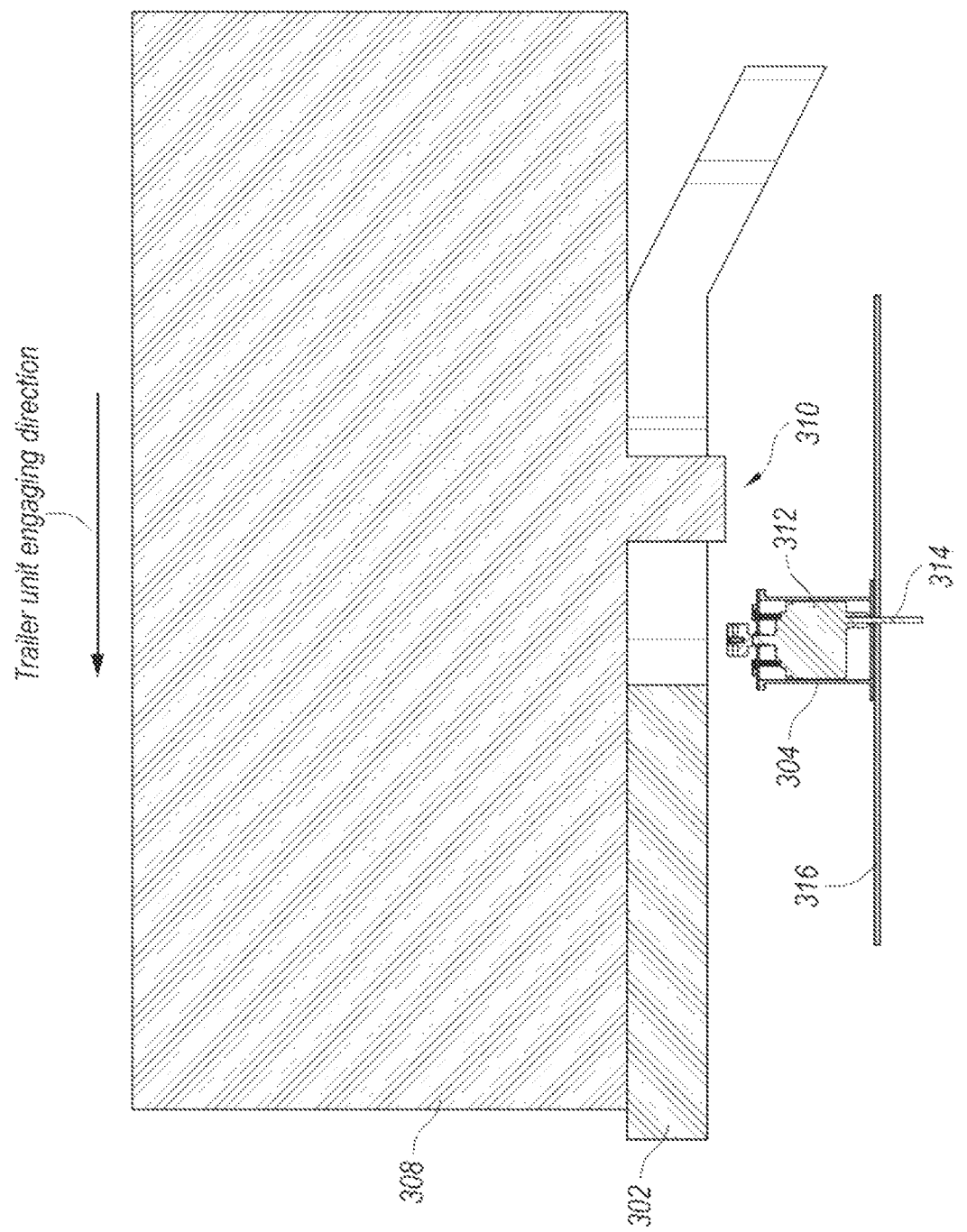
FIG. 3C shows a side cross-section view of a trailer unit and a fifth wheel along with a direction in which the trailer unit is moving to engage the fifth wheel.

FIGS. 3A and 3B respectively show an isometric view and a top view of the fifth wheel 302 with a rotary encoder assembly 304 that is located in or below a hole 306 in the fifth wheel 302. FIG. 3C shows a side cross-section view of a trailer unit 308 and a fifth wheel 302 along with a direction in which a trailer unit 308 is moving to engage the fifth wheel 302. The trailer unit 308 includes a king pin 310 that slides within the groove of the fifth wheel 302 as the trailer engages the fifth wheel 302 in a direction from right to left in FIG. 3C. Below the fifth wheel 302 is a mounting surface 316 that may be connected to the fifth wheel 302 so that the mounting surface 316 and the fifth wheel 302 can move towards or away from the cab in the tractor unit for installation of different types of trailer units. A bottom portion of a rotary encoder assembly 304 may be coupled to the mounting surface 316 below the fifth wheel 302. The rotary encoder assembly 304 is coupled to the mounting surface 316 below the fifth wheel 302 at a location where at least some portion of the rotary encoder assembly 304 overlaps with and is below the hole 306 in the fifth wheel 302 as shown in FIGS. 3A and 3B. In some embodiments, the rotary encoder assembly 304 is coupled to the mounting surface 316 below the fifth wheel 302 at a location where the rotary encoder assembly 304 is directly below a center region of the fifth wheel 302 so that at least a top region of the rotary encoder assembly 304 is accessible via the hole 306.

One of the technical benefits having the rotary encoder assembly 304 couple to the mounting surface 316 below the fifth wheel 302 is that rotary encoder assembly 304 can be installed on a single tractor unit rather than being installed on multiple trailer units. Furthermore, the rotary encoder assembly 304 can installed on the tractor unit without involving the driver. Another technical benefit of the rotary encoder assembly being located on or in the tractor unit is that the rotary encoder assembly 304 can be communicably coupled (e.g., via a cable 314 in FIGS. 3D-3F) to the in-vehicle control computer (shown as 150 in FIG. 1) which can also located in the tractor unit to provide an angle and/or an orientation related information of the trailer unit.

Figure 3D:
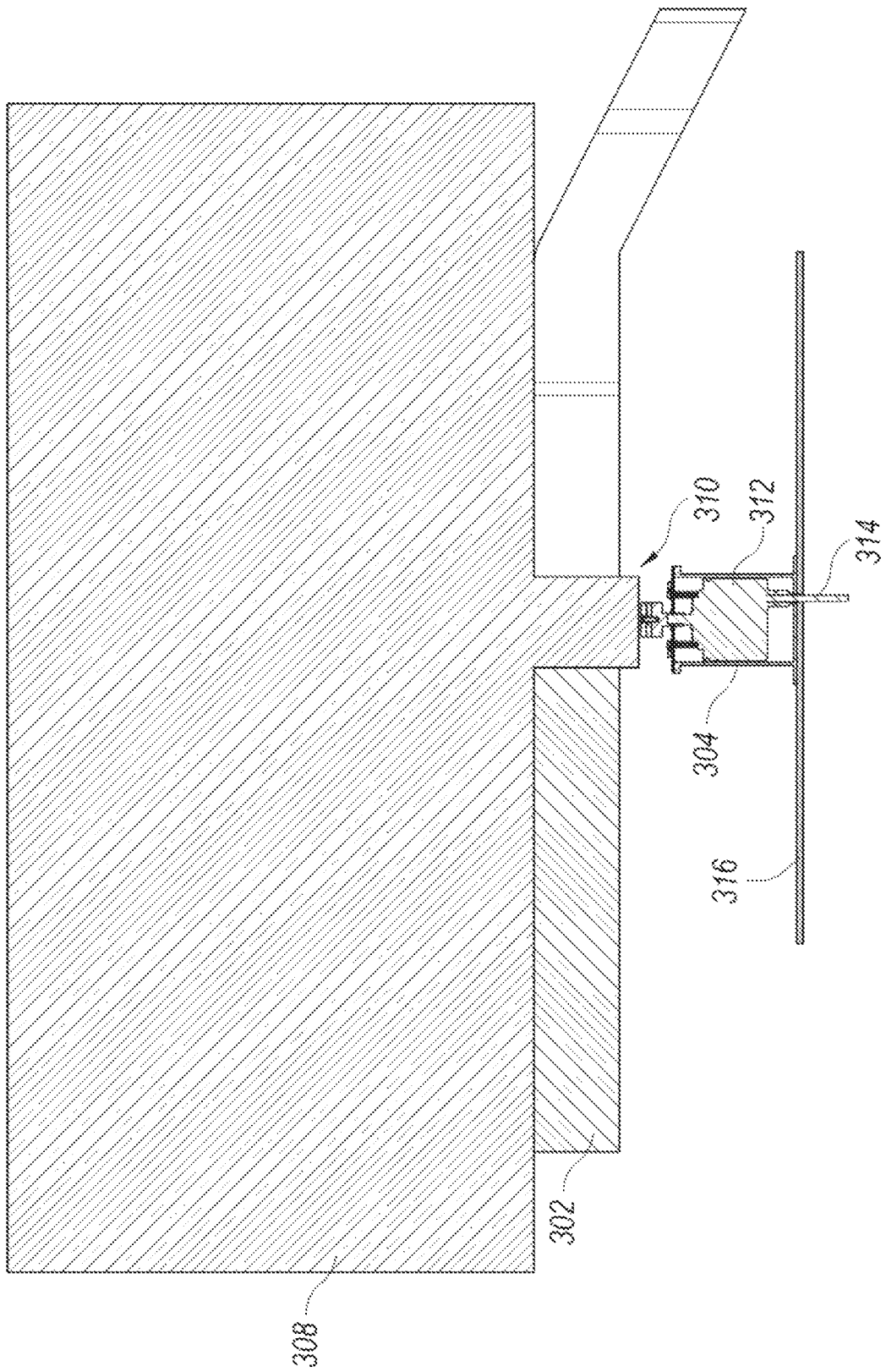
FIG. 3D shows a side cross-section view of a trailer unit and a fifth wheel where the trailer unit that has engaged the fifth wheel.

FIG. 3D shows a side cross-section view of a trailer unit 308 and a fifth wheel 302 where the trailer unit 308 that has engaged the fifth wheel 302. As further explained in FIGS. 4A to 4B, a top region of the rotary encoder assembly 304 includes one or more magnets so that when a metallic king pin 310 (e.g., steel king pin) of the trailer unit 308 is within a magnetic field of the one or more magnets located on top of the rotary encoder assembly 304, at least some portion of the rotary encoder assembly 304, such as the rotary encoder 312, extends towards and magnetically couples with (or magnetically attaches to) the king pin 310. FIG. 3E is an enlarged view of a rotary encoder assembly 304 with a rotary encoder 312 that is in a retracted position when the king pin 310 is moving to engage the fifth wheel 302 and is not close to the rotary encoder assembly 304 or when the king pin 310 is absent from the hole 306 in the fifth wheel 302. In FIG. 3E, the arrow pointing to the left shows the movement of the king pin 310 and the trailer unit 308. When the king pin 310 is not within the magnetic field of the one or more magnets located on top of the rotary encoder assembly 304, the rotary encoder 312 and the cable 314 in the rotary encoder assembly 304 is in a retracted position. When the rotary encoder 312 is in a retracted position, there is some gap in between the top of the one or more magnets located on top of the rotary encoder assembly 304 and the bottom of the king pin that is slid into position to engage the fifth wheel.

Figure 3F:
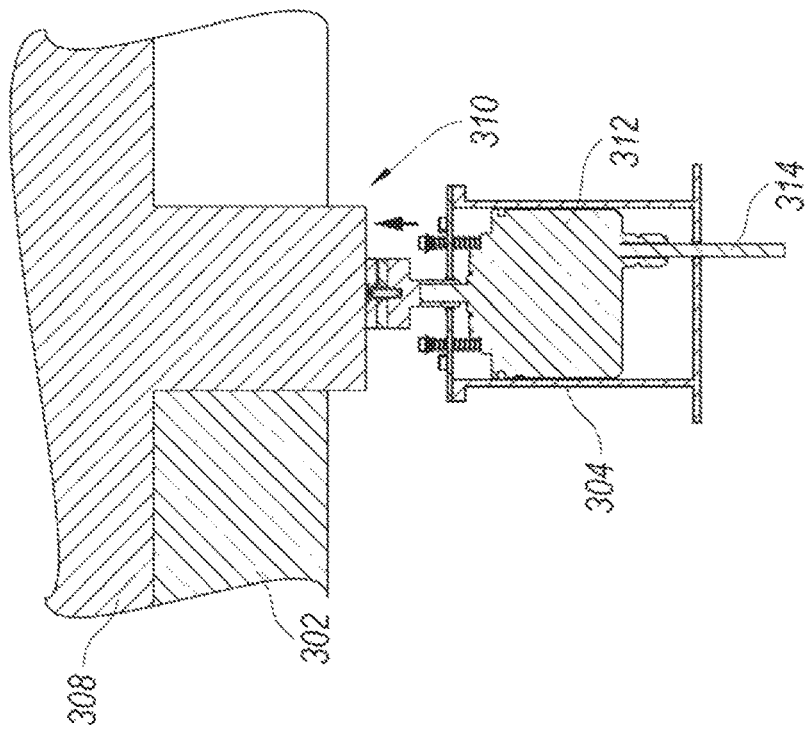
FIGS. 3E and 3F are enlarged views of a rotary encoder assembly with a rotary encoder that is respectively in a retracted position and in an extended position.
Figure 3E:
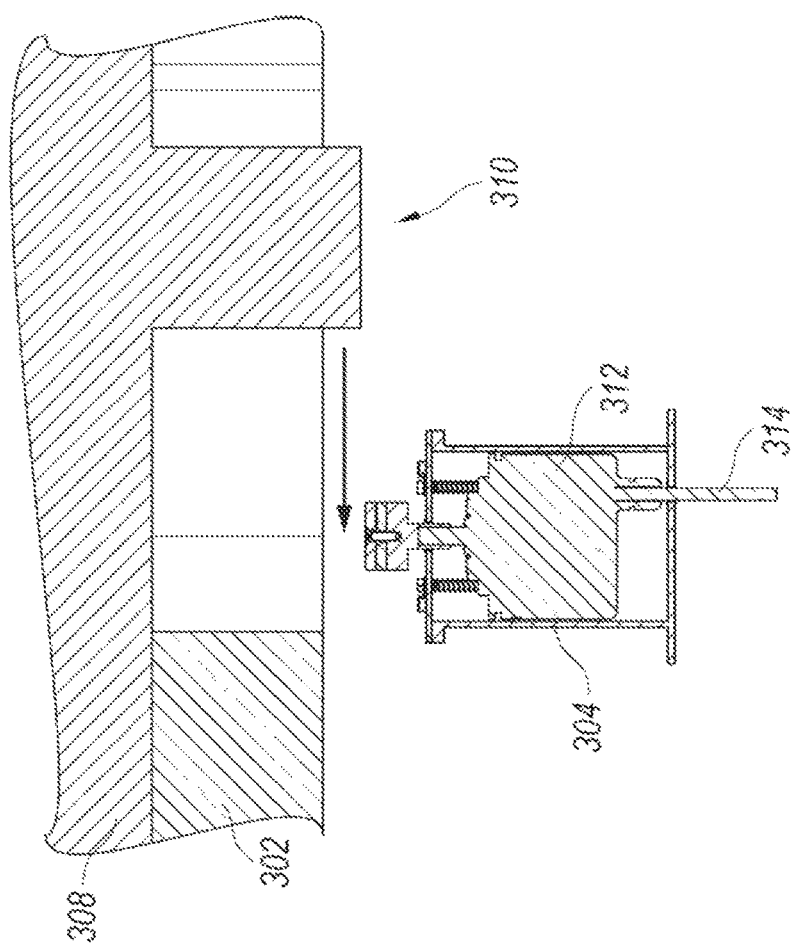

FIG. 3F is an enlarged view of a rotary encoder assembly 304 with a rotary encoder 312 that is in an extended position when the king pin 310 is close to the rotary encoder assembly 304 and has engaged the fifth wheel or when at least a portion of the king pin 310 is located above the hole 306 in the fifth wheel 302. In FIG. 3F, the arrow pointing up shows the movement of the rotary encoder 312 and the cable 314 in the rotary encoder assembly 304 when the one or more magnets on top of the rotary encoder assembly 304 are magnetically coupled with the king pin 310 so that the rotary encoder 312 in the rotary encoder assembly 304 is an extended position. When the king pin 310 disengages the fifth wheel and moves away from the rotary encoder assembly 304, the king pin slides off the one or more magnets on top of the rotary encoder assembly 304 which causes the rotary encoder 312 to move downward and in a retracted position.

Figure 4B:
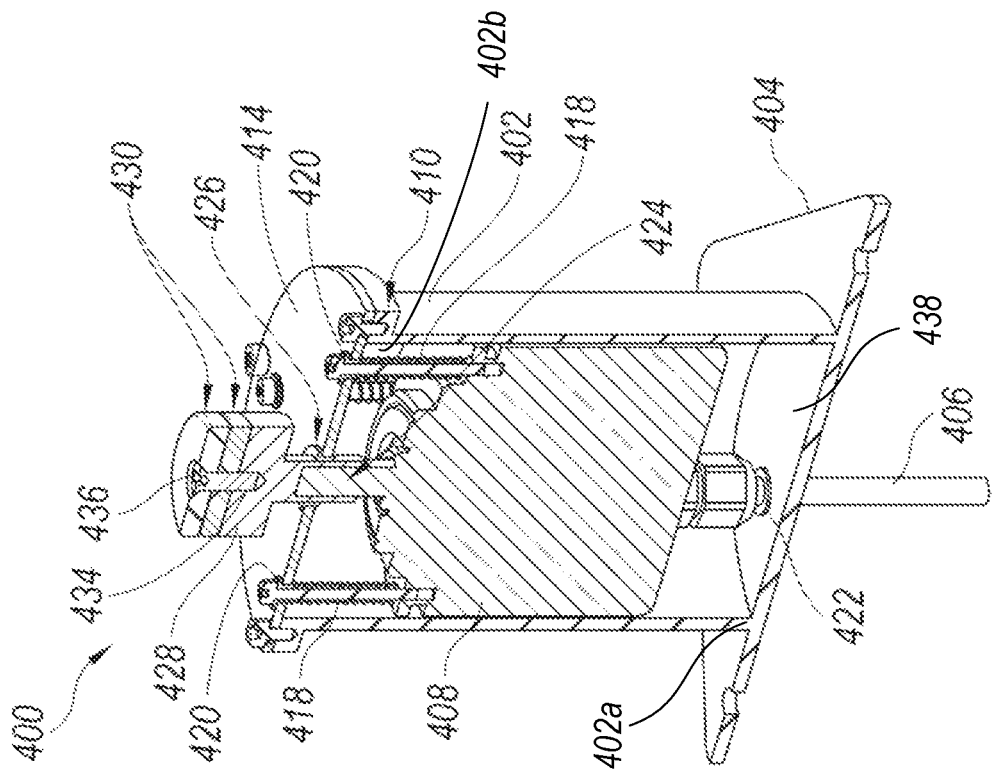
FIGS. 4A and 4B respectively show an isometric view and a cross-section view of a rotary encoder assembly.
Figure 4A:
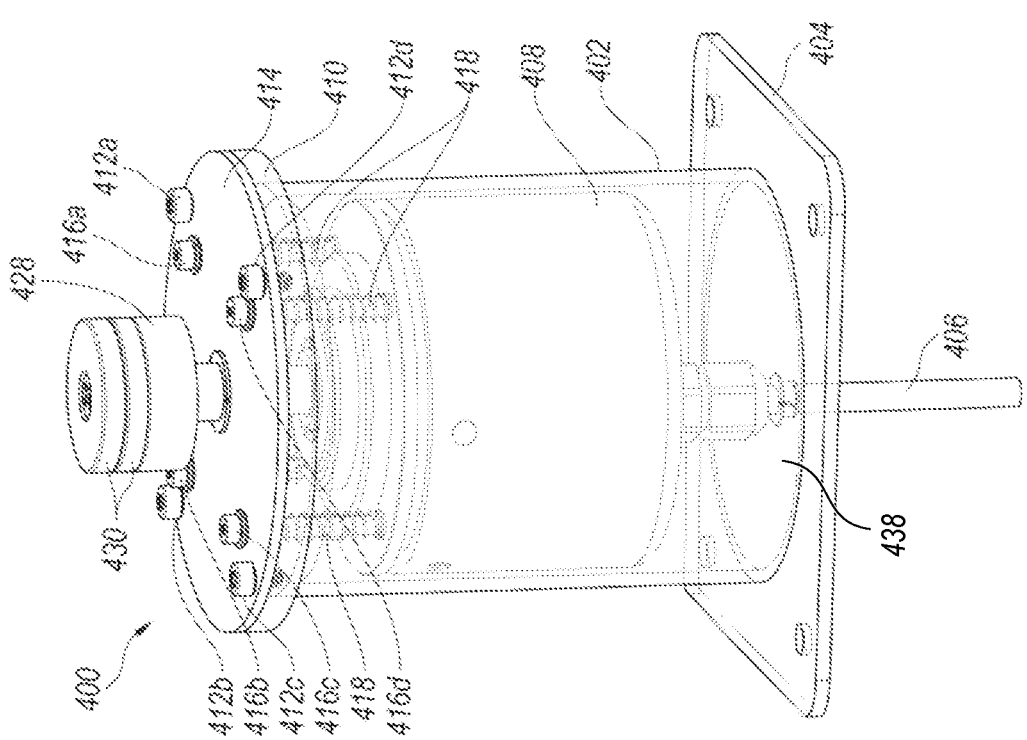

FIGS. 4A and 4B respectively show an isometric view and a cross-section view of a rotary encoder assembly 400. The rotary encoder assembly 400 may include a housing 402 with top region (or one end) 402b and a bottom region 402a (or another end) that is opposite to the top region 402b. The bottom region 402a of the housing 402 is connected to a base surface 404. A top region 402b of housing 402 may have a circular opening with a flange 410 that extends outward from the perimeter of the top region of the housing 402. In some embodiments, as shown in FIGS. 4A and 4B, the housing 402 may have a cylindrical shape. The base surface 404 may have a square or rectangular shape with a plurality of holes that may be located close to (or at some distance away from) an edge of the base surface 404 (e.g., at the corners of the base surface 404). The base surface 404 may include a hole 422 located within a region 438 where the housing 402 is connected to the base surface 404. The hole 422 of the base surface 404 may be used to connect a cable 406 via the base surface 404 to the rotary encoder 408 that is enclosed within the housing 402. The cable 406 includes a set of wires to provide power to the rotary encoder 408 and to receive angle and/or orientation information measured by the rotary encoder 408 to send to the in-vehicle control computer (shown as 150 in FIG. 1). The cable 406 allows the rotary encoder 408 to interface with the in-vehicle control computer via the Society of Automotive Engineers standard SAE J1939 or via a Controller Area Network (CAN) bus. As shown in FIG. 4B, a low-friction grommet or a smooth grommet (e.g., a low-friction nylon shaft grommet) is located at the hole 422 of the base surface 404 in between the cable 406 and the hole 422 so that the rotary encoder 408 along with at least some portion of the cable 406 can move up and down as the compression springs 418 are respectively compressed and extended as further explained below.

The base surface 404 may include four holes as shown in FIG. 4A, where each hole may be located at one of the corners of the base surface 404. The plurality of holes on the corners of the base surface 404 enable the base surface 404 to be coupled via screws to the mounting surface below the fifth wheel. In some embodiments, the base surface 404 may have another shape, such as a circular, oval, or triangular shape where the plurality of holes used to couple the base surface 404 to the mounting surface below the fifth wheel may be located towards the perimeter of the base surface 404.

The flange 410 of the housing 402 includes a plurality of holes that are located around the perimeter of the flange so that a housing cap 414 can be coupled to the housing 402 via screws. For example, as shown in FIG. 4A, four screws 412a-412d that are located at or close to the outer perimeter of the housing cap 414 are used to secure the housing cap 414 to the flange 410 of the housing 402. In some embodiments, the flange 410 may extend inward from the perimeter of the top region of the housing 402.

Figure 4C:
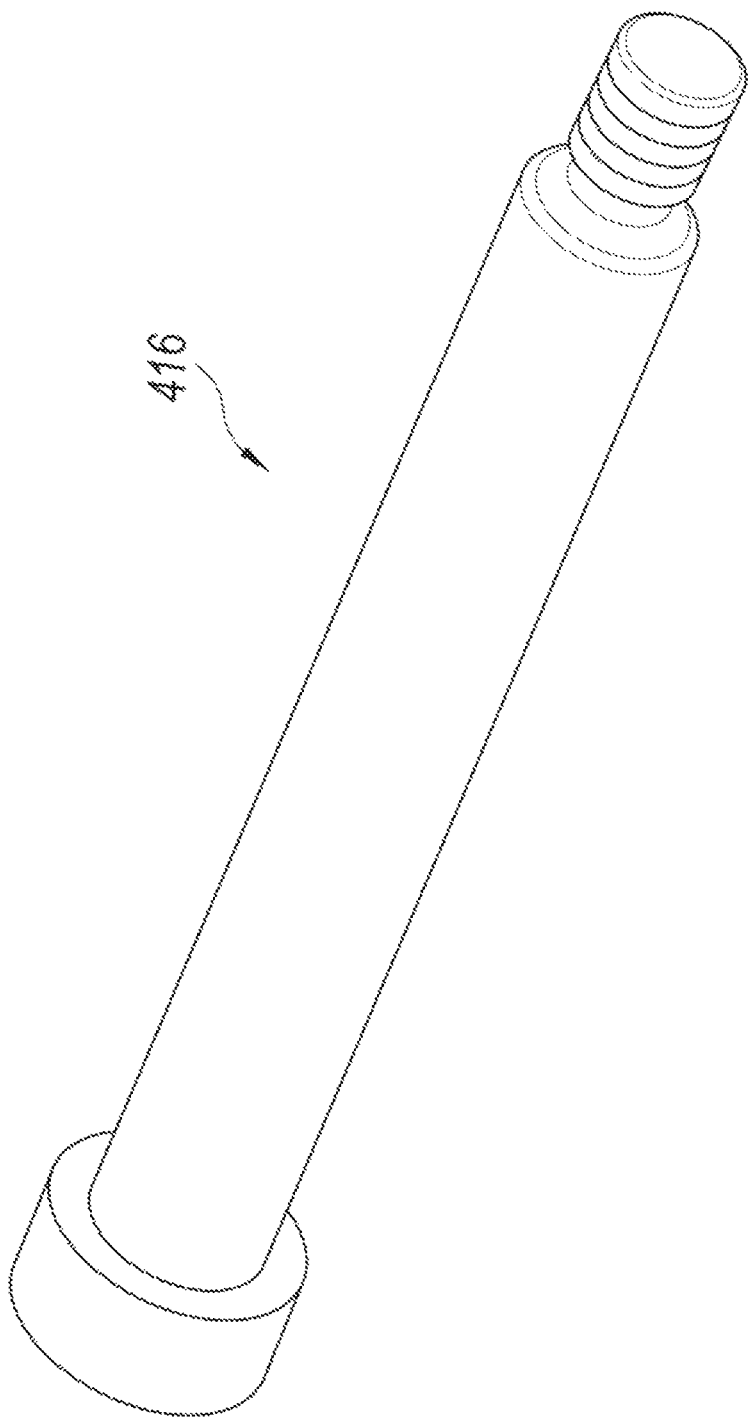
FIG. 4C shows an example shoulder screw.

The housing cap 414 can protect the rotary encoder 408 from the environment, such as from grease or debris that may fall from the trailer unit. The housing cap 414 may have flat circular shape which can correspond to the cylindrical shape of the housing 402 in some embodiments. The shape of housing cap 414 may extend up to an edge of the flange 410 or up to an outer wall of the housing 402. The housing cap 414 includes two sets of holes. A first set of holes in the housing cap 414 are located at a first perimeter that is close to the outer edge of the housing cap 414 so that a first set of a plurality of screws (e.g., four screws 412a-412d in FIG. 4A) can be used to couple the housing cap 414 to the flange 410 of the housing 402. A second set of holes in the housing cap 414 are included at a second perimeter at some distance from the outer edge of the housing cap 414 so that a second set of a plurality of screws (e.g., four screws 416a-416d in FIG. 4A) can be used to couple the rotary encoder 408 to the housing cap 414. The second perimeter of holes in the housing cap can be located within the first perimeter of holes in the housing cap. The second set of plurality of screws may be shoulder screws that have a screw head on one end, a threaded surface on another end, and a smooth shaft (e.g., a cylindrical shaft) between the screw head and the threaded surface. An example of a shoulder screw 416 is shown in FIG. 4C. The shoulder screws are inserted from the top of the housing cap 414 so that the screw head of each shoulder screw is located at or above the housing cap 414 and the threaded surface of each shoulder screw is screwed into the body of the rotary encoder 408.

Each shoulder screw is inserted through a hole in the housing cap 414 thorough a low-friction grommet 420 or a smooth grommet 420 and then through a compression spring 418 to couple with the rotary encoder 408. The low-friction grommets or smooth grommets may be low-friction nylon shaft grommets located at the second set of holes in between the shoulder screws and the second set of holes. The ends of the compressions springs 418 are located in between the rotary encoder 408 and the housing cap 414 so that when the compression springs 418 are mostly extended, the rotary encoder 408 is in a retracted position away from the housing cap 414 within the housing 402 (as shown in FIG. 3E) and when the compression springs 418 are mostly compressed, the rotary encoder 408 is in an extended position towards the housing cap 414 (as shown in FIG. 3F). Thus, when no trailer unit is engaged to the fifth wheel, the rotary encoder 408 is in a retracted position at least because the weight of the rotary encoder 408 and the compression springs 418 push the rotary encoder 408 downward.

At least some portion of the smooth shaft of each shoulder screw is located inside the compression spring 418 so that the shoulder screws 416a-416d function as guide rods for compressions springs 418 which can create non-rigid compressible connections or non-rigid compressible couplings between the rotary encoder 408 and the housing 402 and/or between the rotary encoder 408 and the housing cap 414. As shown in FIG. 3F, when the one or more magnets located on top of the rotary encoder assembly 400 is magnetically coupled to the king pin of the trailer unit, at least some portion of a top of the shoulder screws extend above the housing cap of the rotary encoder assembly 400 due to the one or more magnets pulling the rotary encoder 408 (shown as 312 in FIG. 3F) along with the cable 406 (shown as 314 in FIG. 3F) upward towards the king pin.

The rotary encoder 408 may be a commercial off the shelf (COTS) absolute encoder that may provide an angle and/or orientation (e.g., direction of rotation) information to the in-vehicle control computer. In some embodiments, the rotary encoder 408 may be a mechanical rotary encoder, an optical rotary encoder, or electrical rotary encoder. A top region of the rotary encoder 408 includes a rotatable shaft 424. The rotary encoder 408 measures an angle and/or orientation of the rotatable shaft 424 relative to the base surface 404 or the housing 402 of the rotary encoder assembly 400 so that the rotary encoder 408 provides electrical signals to the in-vehicle control computer indicating an angle and/or orientation of the rotatable shaft 424 relative to the base surface 404 or the housing 404 of the rotary encoder assembly 400.

After the rotatable shaft 424 extends with the rotary encoder 408 to couple to the king pin via the one or more magnets 430 and the shaft adapter 424 (as further explained below), the rotatable shaft 424 rotates together with the king pin as the trailer turns. Since the base surface 404 of the rotatable encoder assembly 400 is coupled to the mounting surface below the fifth wheel and since the rotary encoder 408 is coupled to the housing cap via the shoulder screws, when the rotary encoder 408 with the rotatable shaft 424 extends to magnetically couple the king pin, the rotatable shaft 424 of the rotary encoder 408 turns with the king pin while the body of the rotary encoder 408 mostly does not turn with the king pin. Thus, the circular movement of the king pin is translated to the rotatable movement or rotational movement of the rotatable shaft 424, which is used by the rotary encoder 408 to measure the angle and/or orientation of the trailer unit relative to the tractor unit. The rotatable shaft 424 protrudes or extends from a hole 426 in the center of the housing cap 414. As shown in FIG. 4B, a low-friction grommet or a smooth grommet (e.g., a low-friction nylon shaft grommet) is located at the hole 426 in the center of the housing cap 414 in between the rotatable shaft 424 and the hole 426 in the center of the housing cap 414 so that the rotatable shaft 424 (which is part of the rotary encoder 408) along with at least some portion of the cable 406 can move up and down as the compression springs 418 are respectively compressed and extended as explained above.

A top region of the rotatable shaft 424 includes a shaft adapter 428 which can be coupled to the rotatable shaft by press fit or by a screw. The shaft adapter 428 may have a bottom region (e.g., a cylindrical shape region) that can couple to the rotatable shaft 424. Above the bottom region, the shaft adapter 428 may have a top region (e.g., a cylindrical shape region) that extends outward from the bottom region of the shaft adapter 428. The top region of the shaft adapter 428 has a larger width than the bottom region of the shaft adapter 428 so that the top region of the shaft adapter 428 can be coupled to one or more magnets 430. As shown in FIG. 4B, the top surface of the top region of the shaft adapter 428 may include a threaded hole 434 so that the one or more magnets 430 can be coupled to the top of the top region via the threaded hole 434 via a screw 436. One of the technical benefits of having one or more magnets 430 that can be couple to the top of the rotary encoder 408 is that the one or more magnets 430 can facilitate an easy or flexible height adjustment so that the top of the one or more magnets 430 can magnetically couple to the king pin of the trailer unit. Thus, the flexibility provided by the rotary encoder assembly design described in this document can minimize situations where different rotary encoder assemblies needs to be designed for different king pin design or for different mounting surfaces below the fifth wheel.

The base surface 404, the housing 402, the housing cap 414, and/or the shaft adapter 428 can be made of machined aluminum or other non-magnetic metal so that at least these parts do not interfere with the magnetic coupling operation of the one or more magnets 430 with the king pin of the trailer unit.

In FIG. 1, the angle and/or orientation information provided by the rotary encoder assembly may be used by the autonomous driving module 165 in the in-vehicle control computer 150 to control the vehicle 105. For example, when the vehicle 105 is being parked or is reversed into a dock, the angle and/or orientation information provided by the rotary encoder assembly along with videos from one or more cameras located on the vehicle 105 can enable the autonomous driving module 165 to display a position of the trailer unit on a screen in the vehicle 105 so that the driver may have an accurate understanding of the vehicle 105 with a trailer unit along with any objects surrounding the vehicle 105 when the vehicle is being parked. In some embodiments, the autonomous driving module 165 can control the steering and/or braking of the vehicle 105 based at least on the angle and/or orientation information provided by the rotary encoder assembly. For example, when the vehicle 105 is autonomously parked in a dock or when the vehicle 105 is turning on a road, the autonomous driving module 165 can determine the angle and/or orientation of the trailer unit using the information provided by the rotary encoder assembly and the autonomous driving module 165 can determine position(s) of one or more objects (e.g., vehicles or pedestrians) using video from one or more cameras on the vehicle 105 to control the steering and/or braking of the vehicle 105 so that the movement of the trailer unit is controlled by the autonomous driving module 165.

In another example, when the vehicle 105 is stopped at a traffic sign and is about to make a turn, the autonomous driving module 165 can determine, using the video provided by the one or more cameras and the angle and/or orientation information from the rotary encoder assembly, that the trailer unit may hit another vehicle is located close to the trailer unit of the vehicle 105. In this example, the autonomous driving module 165 can determine a trajectory for the vehicle 105 to steer the vehicle 105 in a way to avoid having the trailer unit hit the vehicle or the autonomous driving module 165 may keep applying brakes until the another vehicle has driven away so that the autonomous driving module 165 can safely turn the vehicle 105.

In yet another example, when the autonomous driving module 165 determines that the vehicle 105 is being driven on a road and that the trailer unit not within a range of angles from a position of the tractor unit (e.g., within ±2 degrees of 180 degrees from the position of the tractor unit or within 179 degrees and 181 degrees from the position of the tractor unit), then the autonomous driving module 165 may apply corrective steering to move the trailer unit to be within the range of angles from the position of the tractor unit. In this example, a gust of wind may have moved the trailer unit relative to the tractor unit so that if the trailer unit move to the left (assuming the vehicle 105 is driven in a north direction), then the autonomous driving module 165 can instruct the motors in the steering system to turn to the left to move the trailer unit back so that the angle formed by the trailer unit relative to the tractor unit is within the range of angles. In some embodiments, the range of angles may be pre-determined or the range of angles may be a function of the speed of the vehicle (e.g., the range of angles is ±2 degrees of 180 degrees if the speed of the vehicle 105 is greater than or equal to a threshold value (e.g., 40 mph) and is ±1 degrees of 180 degrees if the speed of the vehicle is greater than or equal to another threshold value (e.g., 60 mph)).

In some embodiments, the autonomous driving module 165 can update an estimate of the center of gravity to establish a stable boundary around the vehicle 105 based on the angle and/or orientation information provided by the rotary encoder assembly. Knowing the center of gravity of the trailer unit as well as the tractor unit (also known as bobtail), the angle subtended by the trailer unit and the tractor unit can determine where an instantaneous center of gravity of the truck as a whole may be located. Unlike rigid vehicle such as cars and buses, vehicles with multiple drivable sections (e.g., a semi-trailer truck) have a moving center of gravity since it can be composed of at least two objects that are joined by the fifth wheel. In some embodiments, the autonomous driving module 165 may refer to a standard equation that provides an estimate of center of gravity based on an angle measured by the rotary encoder assembly.

The following section describes example features as described in this document:

Feature 1: A truck, comprising: a tractor, comprising: a first connector; and an angle measuring device coupled to the first connector; and a trailer, comprising: a second connector, connecting to the first connector; and at least one magnetic device coupled to the second connector, wherein the angle measuring device measures a motion of the at least one magnetic device, wherein an angle between the tractor and the trailer is determined based on a measurement conducted by the angle measuring device.

Feature 2: The truck of feature 1, wherein the first connector comprises a fifth-wheel, the second connector comprises a kingpin.

Feature 3: The truck of feature 1, wherein the angle measuring device comprises a rotary encoder.

Feature 4: The truck of feature 3, wherein the motion of the at least one magnetic device is translated to a shaft of the rotary encoder.

Feature 5: The truck of feature 1, wherein the angle measuring device measures a rotation of the second connector by measuring the at least one magnetic device.

Feature 6: The truck of feature 1, wherein a boundary of the truck is depicted based on the angle between the tractor and the trailer.

Feature 7: The truck of feature 1, wherein the at least one magnetic device comprises at least one of magnet attached on the second connector, wherein the at least one of magnet is detachable.

Feature 8: The truck of feature 7, wherein at least one sensor is attached to the second connector via the at least one magnet.

Feature 9: A tractor, configured to tow a trailer of a truck, comprising: a first connector, connecting to a second connector of the trailer; and an angle measuring device coupled to the first connector, wherein the angle measuring device measures a motion of at least one magnetic device coupled to the second connector, wherein an angle between the tractor and the trailer is determined based on a measurement conducted by the angle measuring device.

Feature 10: A trailer, configured to be towed by a tractor of a truck, wherein the tractor comprises a first connector and an angle measuring device coupled to the first connector, the trailer comprises: a second connector, connecting to the first connector; and at least one magnetic device coupled to the second connector, wherein the angle measuring device measures a motion of the at least one magnetic device, wherein an angle between the tractor and the trailer is determined based on a measurement conducted by the angle measuring device.

Feature 11: A system, comprising: an internet server, comprising: an I/O port, configured to transmit and receive electrical signals to and from a client device; a memory; one or more processing units; and one or more programs stored in the memory, the one or more programs configured to cause the one or more processing units to perform at least: measuring, by an angle measuring device coupled to a first connector of a tractor, a motion of at least one magnetic device, wherein the at least one magnetic device is coupled to a second connector of a trailer, wherein the first connector is connected to the second connector; and determining an angle between the tractor and the trailer based on a measurement conducted by the angle measuring device.

Feature 12: A method, comprising: measuring, by an angle measuring device coupled to a first connector of a tractor, a motion of at least one magnetic device, wherein the at least one magnetic device is coupled to a second connector of a trailer, wherein the first connector is connected to the second connector; and determining an angle between the tractor and the trailer based on a measurement conducted by the angle measuring device.

Feature 13: A non-transitory computer-readable medium storing a program causing a computer to execute a process, the process comprising: measuring, by an angle measuring device coupled to a first connector of a tractor, a motion of at least one magnetic device, wherein the at least one magnetic device is coupled to a second connector of a trailer, wherein the first connector is connected to the second connector; and determining an angle between the tractor and the trailer based on a measurement conducted by the angle measuring device.

In this document the term "exemplary" is used to mean "an example of" and, unless otherwise stated, does not imply an ideal or a preferred embodiment. In this document, while the techniques to measure angle and/or orientation (e.g., direction of rotation) of a rear drivable section relative to a front drivable section is described in the context of a semi-trailer truck, the rotary encoder assembly may be installed on other types of multiple drivable sections (e.g., on or in a hitch on a truck or on a car with fifth wheel camper).

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVDs), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system for a driving related measurement, comprising:
   a connector located towards a rear region of a vehicle; and
   a measurement apparatus assembly that is accessible through a hole in the connector, wherein the measurement apparatus assembly includes:
      a housing comprising a first surface located towards a top region of the housing, a second surface located towards a bottom region of the housing, and a side surface extending between the first surface and the second surface,
         wherein the first surface and the second surface extend at least up to a perimeter of the side surface on the top region and the bottom region, respectively;
      a measurement device located in the housing and comprising a rotatable shaft that extends towards a first hole in the first surface,
         wherein a top of the rotatable shaft is coupled to one or more magnets that are located above the first hole in the first surface,
         wherein the measurement device is configured to provide an electrical signal that indicates an angle corresponding to an extent of a rotational movement of the rotatable shaft, and
         wherein the measurement device is configured to provide another electrical signal that indicates an orientation corresponding to a direction of the rotational movement of the rotatable shaft; and
      a cable connected to the measurement device, wherein the measurement device and at least some portion of the cable is movable towards the first surface of the housing.

2. The system of claim 1, wherein the connector includes a groove that extends inward from an edge of the connector towards a center region of the connector.

3. The system of claim 1, further comprising:
   a trailer located towards a rear of the vehicle, wherein the trailer is coupled to the connector of the vehicle via a second connector of the trailer, wherein the second connector is magnetically coupled to a top of the one or more magnets that are coupled to the rotatable shaft.

4. The system of claim 3, wherein a number of the one or more magnets is adjustable to cause the top of the one or more magnets to magnetically couple to the second connector.

5. The system of claim 1, wherein the measurement apparatus assembly is located in or below the hole of the connector.

6. The system of claim 1, wherein the connector includes a fifth wheel.

7. The system of claim 1, wherein the second surface includes a second hole that includes a portion of the cable that is connected to the measurement device.

8. The system of claim 1, wherein the cable is connected to a bottom of the measurement device that faces towards the second surface of the housing.

9. The system of claim 1, wherein the measurement apparatus assembly is coupled to a surface below the connector of the vehicle.

10. The system of claim 1, wherein the measurement device is movable towards the first surface of the housing via a plurality of compressible springs.

11. A measurement apparatus assembly, comprising:
    a housing comprising a first surface located towards a top region of the housing, a second surface located towards a bottom region of the housing, and a side surface extending between the first surface and the second surface,
       wherein the first surface and the second surface extend at least up to a perimeter of the side surface on the top region and the bottom region, respectively; and
    a measurement device located in the housing and comprising a rotatable shaft that extends towards a first hole in the first surface,
       wherein a top of the rotatable shaft is coupled to one or more magnets that are located above the first hole in the first surface,
       wherein the measurement device is configured to provide an electrical signal that indicates an angle corresponding to an extent of a rotational movement of the rotatable shaft,
       wherein the measurement device is configured to provide another electrical signal that indicates an orientation corresponding to a direction of the rotational movement of the rotatable shaft, and
       wherein the measurement device is movable towards the first surface of the housing.

12. The measurement apparatus assembly of claim 11, wherein the measurement device is movable towards the first surface of the housing via a plurality of compressible springs.

13. The measurement apparatus assembly of claim 12, wherein the plurality of compressible springs are located in between the measurement device and a bottom of the first surface of the housing that faces the measurement device.

14. The measurement apparatus assembly of claim 13, wherein the plurality of compressible springs in a compressed position cause the measurement device to move towards the first surface of the housing.

15. The measurement apparatus assembly of claim 13, wherein the plurality of compressible springs in an extended position cause the measurement device to move away from the first surface of the housing.

16. The measurement apparatus assembly of claim 12, wherein the measurement device is movably coupled to the first surface of the housing via a plurality of screws.

17. The measurement apparatus assembly of claim 16, wherein each screw includes a smooth region located in a compressible spring from the plurality of compressible springs.

18. The measurement apparatus assembly of claim 11, wherein the first surface is coupled to the side surface of the housing towards the top region of the housing.

19. The measurement apparatus assembly of claim 11, wherein the first surface, the second surface, and the side surface of the housing comprise a non-magnetic metal.

20. The measurement apparatus assembly of claim 11, wherein at least some portion of the rotatable shaft protrudes from the first hole in the first surface of the housing.

* * * * *